United States Patent
Gajewski (10) Patent No.: US 8,456,134 B2
(45) Date of Patent: Jun. 4, 2013

(54) SYSTEM AND METHOD FOR APPLYING A PLURALITY OF ENERGY PULSES TO A CATHODE FOR RAPID DEPOLARIZATION OF BATTERIES

(75) Inventor: Marek Gajewski, Goleta, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 13/239,842

(22) Filed: Sep. 22, 2011

(65) Prior Publication Data

US 2013/0076300 A1    Mar. 28, 2013

(51) Int. Cl.
*H01M 10/44* (2006.01)
*H01M 10/46* (2006.01)

(52) U.S. Cl.
USPC .......................................... 320/131

(58) Field of Classification Search
USPC ............... 320/107, 127, 128, 131, 137, 141, 320/145; 429/90, 92; 324/425
See application file for complete search history.

(56) References Cited

U.S. PATENT DOCUMENTS

| | | | | |
|---|---|---|---|---|
| 4,839,248 A | * | 6/1989 | Magnussen et al. | 429/49 |
| 5,656,395 A | * | 8/1997 | Dopp et al. | 429/233 |
| 6,118,251 A | | 9/2000 | Atwater | |
| 6,514,637 B2 | * | 2/2003 | Treger et al. | 429/56 |
| 6,797,134 B2 | * | 9/2004 | Weinberg et al. | 307/106 |
| 2009/0248100 A1 | | 10/2009 | Vaisnys et al. | |

FOREIGN PATENT DOCUMENTS

| | | |
|---|---|---|
| EP | 0891000 A2 | 1/1999 |
| GB | 2305557 A | 4/1997 |
| WO | WO 2008/114219 A1 | 9/2008 |

OTHER PUBLICATIONS

Extended European Search Report dated Dec. 19, 2012 in connection with European Patent Application No. 12175464.2, 8 pages.
Moshtev, et al; "Investigation and Production Control of Li/So2 Cells by the Galvanostatic Pulse Method"; 6040 Journal of Power Sources, vol. 8 No. 4, Nov. 1982; 7 pages.

* cited by examiner

Primary Examiner — Edward Tso (57) ABSTRACT

According to an embodiment of the disclosure, a system for conditioning a battery include a pulse generator and a use sensor. The pulse generator is configured to apply a plurality of energy pulses to a polarized cathode of a battery and a passivated anode of the battery by selectively shorting the battery across the polarized cathode and the passivated anode for durations of time. The plurality of energy pulses at least partially depolarize the polarized cathode and at least at least partially depassivate the passivated anode. The use sensor is configured to detect a use of the battery with a device and communicate the detected use to the pulse generator. The pulse generator automatically applies the plurality of energy pulses upon receipt of the detected use.

20 Claims, 5 Drawing Sheets

SYSTEM AND METHOD FOR APPLYING A PLURALITY OF ENERGY PULSES TO A CATHODE FOR RAPID DEPOLARIZATION OF BATTERIES

TECHNICAL FIELD

The present disclosure is directed, in general, to batteries, and more specifically, to a system and method for applying a plurality of energy pulse to a cathode for rapid depolarization of batteries.

BACKGROUND OF THE DISCLOSURE

Some non-rechargeable batteries, like LiSO2 (lithium sulfur dioxide), exhibit the phenomena of anode passivation and cathode polarization. These phenomena reduce the voltage that is immediately available in the battery in what is known as "voltage delay." When feeding a switching power, or a similar device operating in constant power mode, a reduction in such available voltage forces an additional current in the battery that even further reduces the available voltage. Additionally, cold temperatures can exacerbate the negative effects of such phenomena. Such occurrences prevent desired battery operation.

SUMMARY OF THE DISCLOSURE

To address one or more of the above-identified deficiencies of the prior art, one embodiment of the disclosure is a system for conditioning a battery and includes a pulse generator and a use sensor. The pulse generator is configured to apply either a single or a plurality of energy pulses to a polarized cathode of a battery and a passivated anode of the battery by selectively either shorting the battery across the polarized cathode and the passivated anode, or causing a current flow limited by an external element, for a duration of time. The energy pulses at least partially depolarize the polarized cathode and at least partially depassivate the passivated anode. The use sensor is configured to detect a use of the battery with a device and communicate the detected use to the pulse generator. The pulse generator automatically applies the pulses upon receipt of the detected use. The depolarization/depassivation can also be applied at any time prior to actual use of the battery in the designated application, as a part of the preventive maintenance.

Certain embodiments of the disclosure may provide numerous technical advantages. For example, a technical advantage of one embodiment may include the capability to depolarize a cathode by applying high current, short duration pulses thereto. Other technical advantages of other embodiments may include the capability to automatically apply high current, short duration pulses to a cathode of a battery upon turn-on of a device utilizing the battery in order to depolarize the cathode of the battery and achieve maximum voltage quickly. Yet other technical advantages of other embodiments may include the capability to both depassivate and depolarizes the battery quickly. Still yet other technical advantages of other embodiments may include the capability to both depassivate and depolarizes the battery on demand at low temperatures.

Although specific advantages have been enumerated above, various embodiments may include all, some, or none of the enumerated advantages. Additionally, other technical advantages may become readily apparent to one of ordinary skill in the art after review of the following figures and description.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

It should be understood at the outset that, although exemplary embodiments are illustrated below, the present invention may be implemented using any number of techniques, whether currently known or not. The present invention should in no way be limited to the example implementations, drawings, and techniques illustrated below, and no such limitation is intended. Additionally, the drawings are not necessarily drawn to scale.

Figure 1A:
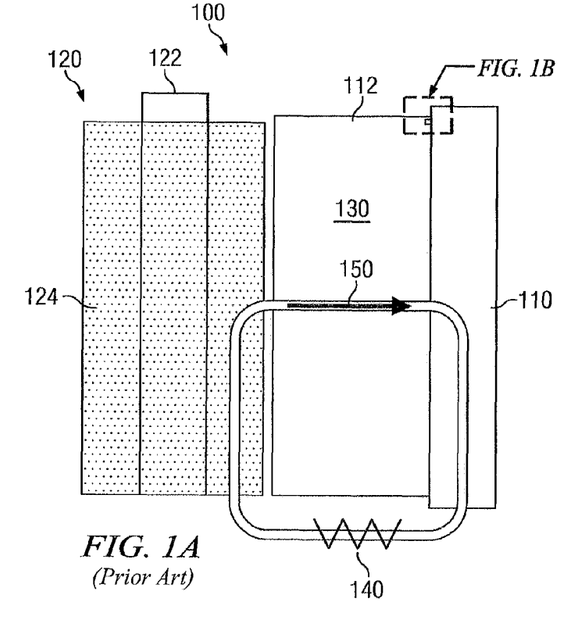
FIGS. 1A and 1B illustrate a conventional battery and negative effects that may occur thereto over time.
Figure 1B:
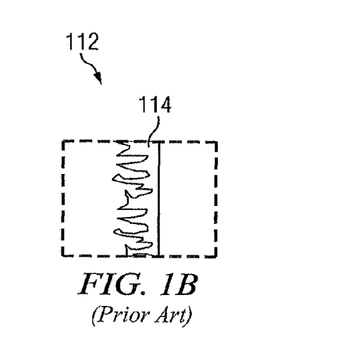

FIGS. 1A and 1B illustrate a conventional battery 100 and negative effects that may occur thereto over time. For purposes of illustration, the battery 100 will be described with reference to a non-rechargeable $LiSO_2$ (lithium sulfur dioxide) battery. Although a particular type of battery will be disclosed herein, it should be understood that the teachings of the disclosure may also be applied to other batteries or electrochemical processes that are bilateral in nature and tend to corrode. Further, although the pulse techniques disclosed herein are particularly applicable to non-rechargeable batteries, they may also be used with rechargeable batteries for the purpose of rapid recharging of the battery at an effective rate shorter than that achievable with an equivalent average DC charging current. Since a chemical reaction is taking place during charging, and the reactivity of materials participating in the reaction, as enumerated by the probability of the materials to both shed, or accept an electron, is generally a function of impulse energy, or, equivalently, high frequency of the charging energy, applied to the reaction site, then the time to transpose a volume of electrons from one electrode to another is shorter when a plurality of high di/dt pulses is applied in preference to DC current.

The battery 100 in FIG. 1 includes an anode 110, a cathode 120, and an electrolyte 130. In a $LiSO_2$ battery, the anode 110 is lithium; the electrolyte is $SO_2$, which due to high pressure is liquefied; and the cathode 120 includes a carbon rod 122 surrounded by a carbon porous material 124. The porous material 124 provides a larger surface area in which electrons can flow, thereby providing a large emitting surface.

As will be recognized by one of ordinary skill in the art, the anode 110 undergoes oxidation and releases free electrons while the cathode 120 accepts electrons and undergoes a reduction. The electrons are passed through a load current flow 140 to the porous material 124. Additionally, an internal current flow 150 exists in which the cathode 120 creates ions that are passed to the electrolyte 130 and the anode 110.

Over time, due in large part to the internal current flow 150, the above two referenced phenomena—passivation and polarization—occur. Both can occur while the battery 100 is sitting on a shelf.

During passivation, the anode 110 is coated with a thin layer of non-conductive $Li_2SO_4$ (lithium sulfate). With reference to FIG. 1B, the surface 112 of the anode 110 can take on the appearance of rough dendritic spikes 114. This coating causes the internal current flow 150 to fall. In particular configurations, passivation of the battery 100 can occur in a matter of hours. Depending on the particular type of battery, the rate of passivation may change.

During polarization, the porous material 124 accumulates various reactants, ion clusters, and charges, thereby reducing available cathode voltage and electron mobility or conductivity. In particular configurations, polarization may be a slower process and occur over a matter of weeks. Depending on the particular type of battery, the rate of polarization may change.

In addition to the above passivation and polarization phenomena, cold temperatures can negatively affect the battery 100 by causing the electron mobility of the electrolyte 130 to decrease. In such scenarios, the electrolyte 130 may congeal or gel, causing the electrolyte 130 to act like a high viscosity material reducing electron mobility therethrough. Depending on the components of the battery, the negative effects of low temperature may be more or less detrimental.

In conventional scenarios, a battery may partially depassivate and depolarize over a matter of hours. In such scenarios, an immediate voltage is diminished and may not be within a desired range until hours of time have passed to allow partial depassivation and depolarization. Such a delayed process not only wastes time, but also wastes energy in the battery 100. Cold temperatures further exacerbate such problems, causing additional time for a battery to reach its optimal operating condition—if it even reaches such an operating condition.

Given such problems, certain embodiments disclose the application of high current and short duration energy pulses to the battery 100. These energy pulses shatter and break the passivation layer on the anode 110 and rapidly exite the cathode 120 to remove the polarization gunk (reactants, ion clusters, and charges) on the cathode 120. In particular embodiments, the high current and short duration pulses quickly depassivate and depolarize the battery, allowing operation with a desired voltage in a matter of seconds as opposed to hours.

In particular embodiments, these energy pulses are applied automatically and on-demand when a current for use of the battery is detected. In other configurations, these energy pulses are applied automatically and on-demand when the battery is below a certain temperature and use of the battery is detected.

Figure 2:
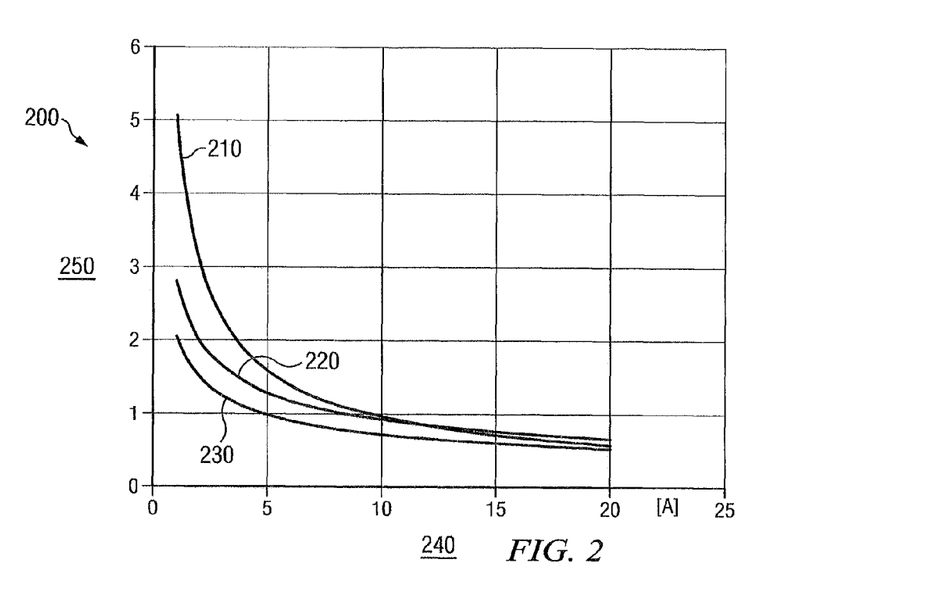
FIG. 2 is a chart, illustrating the relationship of current and resistance, according to an embodiment of the disclosure.

FIG. 2 is a chart 200, illustrating the relationship of current and source resistance of the battery, according to an embodiment of the disclosure. In the chart 200, the x-axis 240 represents current in Amperes while the y-axis 250 represents normalized resistance. There are three examples charted: (1) one at −40 degree Celsius (represented by line 210), (2) one that has been sitting idle for one week at ambient temperature (represented by line 220), and (3) one that is at ambient temperature (represented by line 230). Looking at just the three lines 210, 220, and 230, one can see that the older the battery is, the more resistance that builds up. Additionally, colder batteries have increased resistance. The chart 200 will scale with the size of battery, and/or a number of cells stacked in series.

In an ideal battery, resistance would be zero. However, as will be recognized by one of ordinary skill in the art, batteries have a static ohmic resistance. In addition to such static ohmic resistance, there is also resistance from the above-described cathode polarization and anode passivation.

The chart 200 illustrates that resistance decreases as the current increases for every battery charted. At roughly 15-20 amperes, the lines 210, 220, and 230 begin to converge and become more horizontal, indicating that the effects of passivation and polarization are diminished and that only ohmic resistance remains.

Particular embodiments of the disclosure avail from the above-described phenomena. However, instead of a continuous DC current, a high di/dt (change in current over a change in time) pulse train is applied, which may also be an electrical short applied across the cathode and anode for a short duration of time. The pulses are more effective at depassivating and depolarizing the battery.

Figure 3:
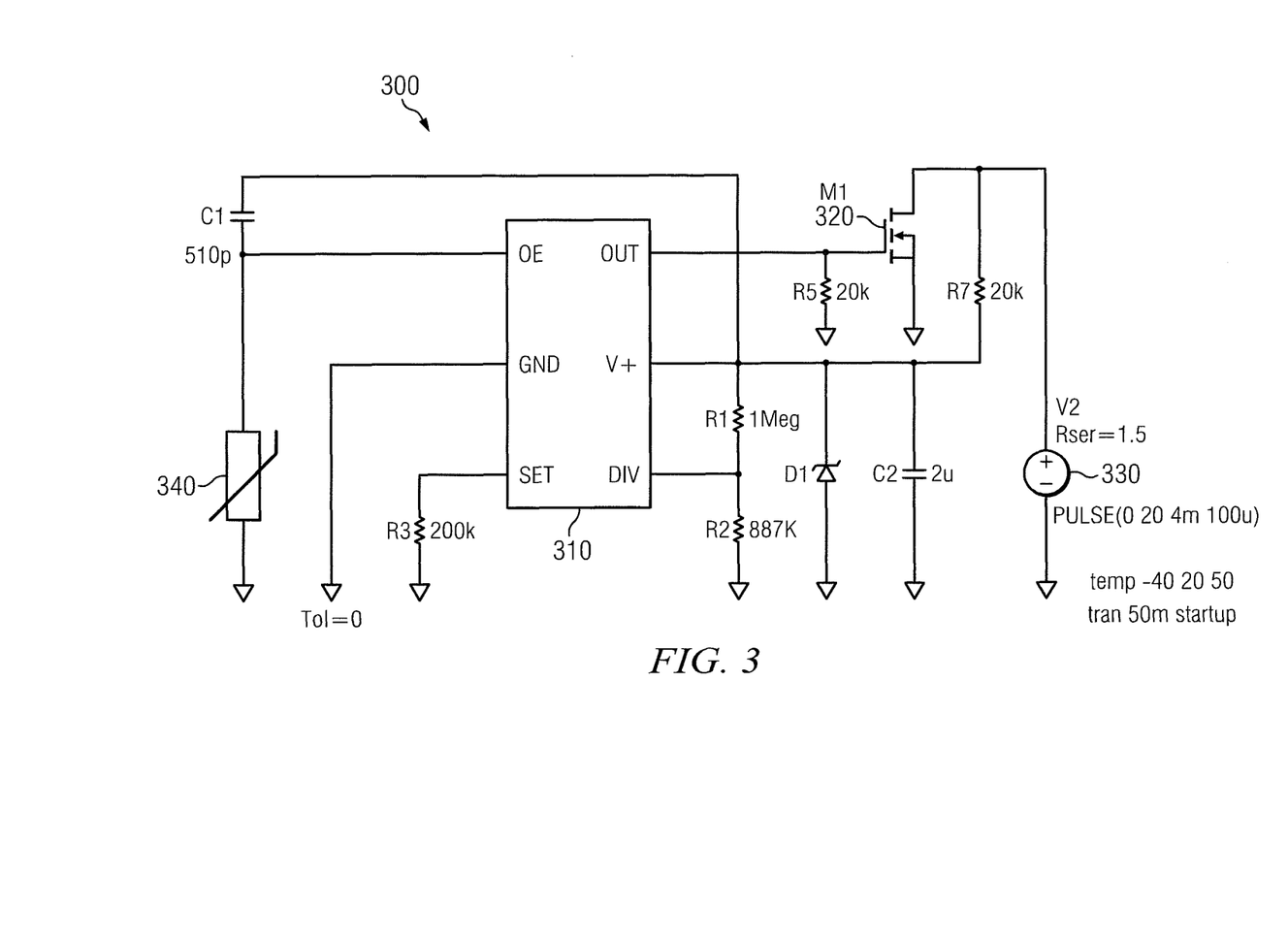
FIG. 3 illustrates an energy pulse generator, according to an embodiment of the disclosure.

As one of ordinary skill in the art will appreciate for example with a C-sized battery, currents above 10 amps are typically not applied in a battery. Accordingly, the current energy pulses may be multiples of times higher than an amplitude of a nominal current of the battery while in use with a device FIG. 3 illustrates a pulsing generator 300, according to an embodiment of the disclosure. Many of the disclosed circuit components in the pulsing generator 300 will become apparent to one of ordinary skill in the art; accordingly, for purpose of brevity, the interaction of every circuit element will not be explicitly described. The pulsing generator 300 includes a block 310 that produces a train of signals or pulses, which should not be confused with the energy pulses for the cathode and anode. In particular embodiments, the block 310 may be a voltage controlled oscillator. The train of signals are applied to a switch 320 or M1 that when activated applies a selective short across the battery 330—a pulse. Any of a variety of switches can be used, including switches that cause an action when a signal is received and switches that cause an action when a signal is not applied. Also shown are resistors R1, R2, R3, R5, R6, and R7; capacitors C1, C2, and C3; a diode element D1; and a thermistor 340.

As referenced above, at lower temperatures, the aforementioned problem with polarization and/or passivation become pronounced in part due to a gelling of the electrolyte. Therefore, according to some embodiments, the pulse generator 300 may measure the temperature and only switch on if below a certain threshold temperature.

Although a particular circuit has been provided for a pulse generator 300 in FIG. 3, any of a variety of other configurations may be utilized for a pulse generator, including those with more, less, or different component parts. Examples of components that may be used for the pulse generator in certain embodiments are provided below in FIG. 9.

Figure 4:
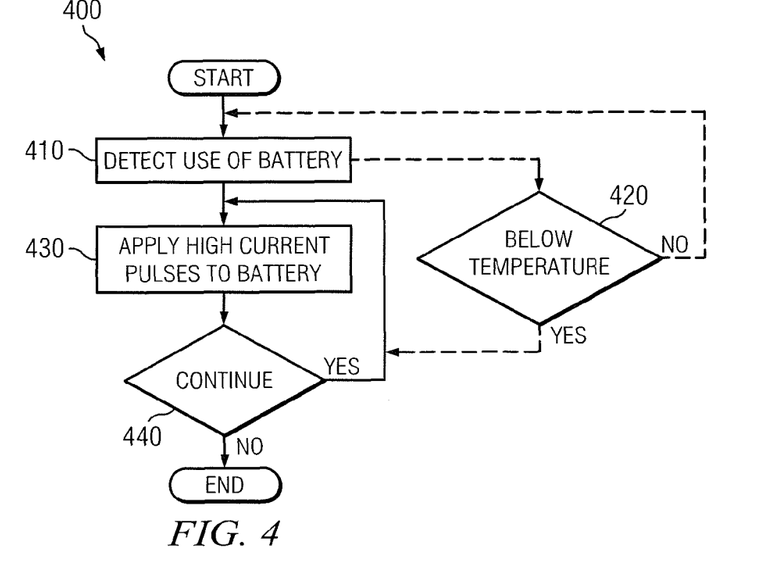
FIG. 4 illustrates a process of reconditioning a battery with energy pulses, according to an embodiment of the disclosure.
Figure 5:
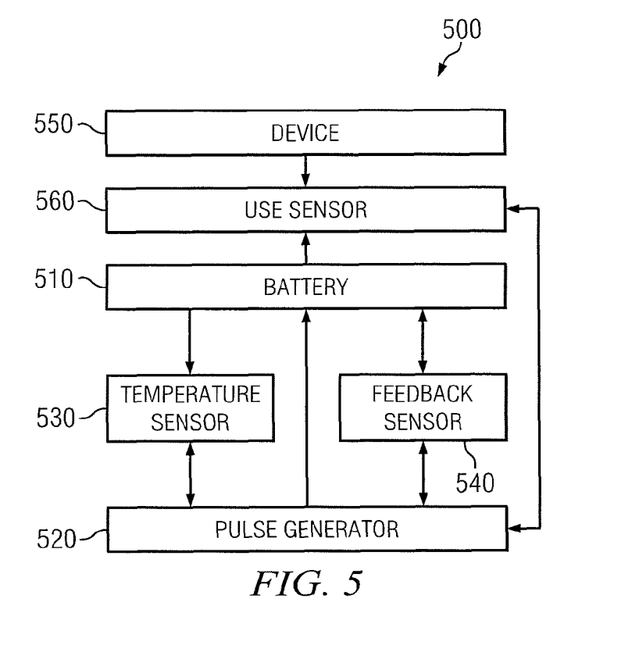
FIG. 5 illustrates reconditioning components that may be associated with the process of FIG. 4, according to embodiment of the disclosure.

An alternative embodiment may consist of the Positive Temperature Coefficient (PTC) switching element, that may be constructed either as a simple fuse, or a thermostatic switch, or a more complex electronically controlled switch, and hereinafter referred to as the "fuse", applied across the battery to produce a effectively a short pulse when the battery is connected to the load. The fuse resistance at and below ambient temperature is low, thereby forcing a large short current. After a short thermal time constant, a parameter of value specific to the PTC fuse selected, the fuse will reach a trip temperature, typically around 150 degC, at which point the resistance would increase dramatically, thereby arresting further current flow through the fuse, and terminating the pulse. Depending on the construction of the "fuse" a small amount of current may, but does not have to, continue to flow through the fuse after the trip, as required to maintain its temperature above the trip temperature—the value depends on the battery voltage operating voltage. FIG. 4 illustrates a process 400 of reconditioning a battery with energy pulses, according to an embodiment of the disclosure. FIG. 5 illustrates reconditioning components 500 that may be associated with the process 400 of FIG. 4, according to an embodiment of the disclosure. The lines between each respective component 500 may represent any suitable communication of information—be it via circuit, a communication bus, or other suitable communication medium. The process 400 will be described with reference to both FIGS. 4 and 5.

The process 400 may begin with detecting a use of the battery 510 at step 410. This may occur through a use sensor 560 that either detects, for example, current flow in the battery 510 or current flow in a device 550 that utilizes the battery 510 for operation.

In particular configurations (although not every configuration), the process 400 may also determine whether a temperature measured by a temperature sensor 530 is below a predefined threshold. As referenced above, in particular configurations the problems with polarization and/or passivation may be more pronounced with cold temperatures. Accordingly, in certain configurations, the process may only proceed if the temperature is below a certain level as indicated by decisional step 420. In such configurations, the temperature sensor 530 may communicate information to the pulse generator 520. Either the temperature sensor 530 or the pulse generator 520 may determine whether the temperature is below a temperature threshold. In other configurations, step 420 may not occur and the process 400 may simply move on to step 430.

At step 430, a plurality of high current energy pulses may be applied on the battery to depassivate and depolarize the battery. A pulse generator 520 may initiate the plurality of energy pulses using information gathered from one or both of the temperature sensor 530 and user sensor 560. The pulse generator 520 may be the pulse generator 300 of FIG. 3. Alternatively, the pulse generator 520 may be any other suitable device that can initiate and/or apply an energy pulse on the anode and cathode.

The high current may be a shorting of the cathode and anode for a short duration of time. With regards to the anode, the high current, short duration energy pulses apply an electric field that shatters and break the dendritic spikes of the passivation layer, thereby exposing clean lithium, for example, in a LiSO$_2$ battery.

With regard to the cathode, the high current, short duration energy pulses, rapidly excite the polarization gunk (reactants, ion clusters, and charges) clogging the pores of the cathode. These high current, short duration energy pulses cause the polarization gunk to break apart and be effectively dislodged from the pores of the cathode material.

In particular embodiments, the circuitry for the pulses may be part of the load circuitry of the battery, allowing the short across the anode and the cathode.

In particular embodiments, the rate of the energy pulses may be 1000 times per second (1 kHz) with each pulse lasting 100 microseconds. In other embodiments, the rate may be more than or less than 1 kHz with each pulse lasting more than or less than 100 microseconds. In particular embodiments, the current is normally limited by source resistance of the battery and may exceed 20 Ampere. In other embodiments, the current peaks may be purposely limited via elements external to the battery, to maintain the RMS current below a desired value.

In particular configurations, the high current energy pulses may all be of similar amplitude. In other configurations, the high current pulses may be of varied amplitude, for example, as described below with reference to FIGS. 7 and 8.

After application of a set of high current pulses, the process may determine at decisional step 440 whether or not more pulses should be applied. In particular configurations, pulses may be applied for a preset amount of time. In other configurations, a feedback sensor 540 measures parameters of the battery 510 that may be assessed for such a determination. For example, energy pulses may be applied and the voltage measured such that when diminishing returns on the energy pulses are measured, the energy pulses are no longer applied.

As a non-limiting example, in an ideal battery with no resistance, an observed voltage across a load of the battery should be a theoretical maximum. However, due to the ohmic resistance, passivation, and polarization, the observed voltage is less than theoretically achievable at given load current and battery temperature. Accordingly, one can measure the degree to which depolarization and depassivation have occurred by observing how close the voltage for a pulsed short across the battery is to the theoretical value. This observed voltage can be measured by the feedback sensor 540. Such a feedback may be used to determine the number of pulses.

When a determination has been made not to continue, the process ends and the battery 510 may be used as normal with maximum voltage. Once again, in particular configurations, the determination may simply be that a maximum time has elapsed.

In particular embodiments, the steps of process 400 may be completely transparent to a user and occur automatically. As an example illustration, a battery 510 may be used in a flash light or with a variety of other devices 550. When a user turns on the flashlight or other device 550, the process 400 may automatically be initiated with the pulses being rapidly applied to the battery 510. Then, the pulses stop and the flashlight or other device 510 is used as normal with a desired voltage.

Figure 6:
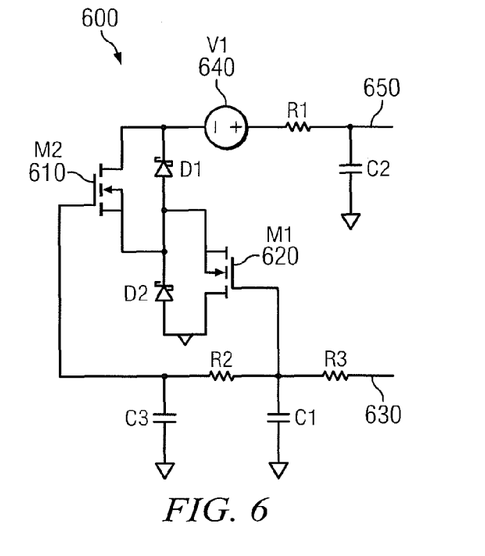
FIG. 6 illustrates a behavioral electrical model, according to an embodiment of the disclosure.

FIG. 6 illustrates a behavioral model 600 of the battery, according to an embodiment of the disclosure. Like FIG. 3, many of the disclosed circuit components in the model 600 will become apparent to one of ordinary skill in the art; accordingly, for purpose of brevity, the interaction of every circuit component will not be explicitly described. The model 600 is consistent with the observed behavior of the source resistance of the battery as illustrated in FIG. 2, and includes a simulated cathode polarization element 610 (represented by a diode element D1 and a voltage dependent resistance element M2), a simulated anode passivation element 620 (represented by diode element D2 and a voltage dependent resistance element M1), a current sensing input 630, a battery 640, and an output 660. Also shown are resistors R1, R2, and R3; capacitors C1, C2, and C3 acting as time delays affectuating M1 and M2. As can be seen in the model 600 of FIG. 6, the current sensing input 630 makes both the simulated cathode polarization element 610 and the simulated anode passivation element 620 a function of current. The higher the current, the more conductive the simulated cathode polarization element 610 and the simulated anode passivation element 620 become and more perfect the battery 640 becomes. Although the model 600 of FIG. 6 simulates what is happening with polarization and passivation, the model 600 of FIG. 6 does not necessarily simulate a pulsating current, which are simulated with reference to FIG. 7 below.

Figure 7:
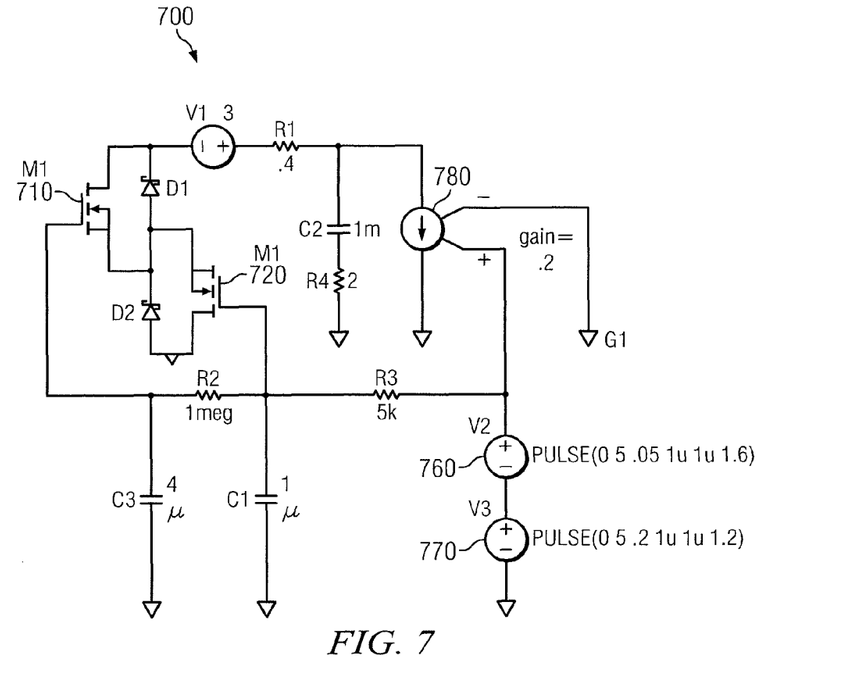
FIG. 7 illustrates use of said model in a computer simulation, according to an embodiment of the disclosure.

FIG. 7 illustrates the use of model 600 in simulation as model 700, according to an embodiment of the disclosure. FIG. 7 is similar to FIG. 6 except that pulses are represented by the current element 780. Also shown are resistors R1, R2, and R3; capacitors C1, C2, and C3; a simulated cathode polarization element 710 (represented by diode element D1 and element M2); a simulated anode passivation element 720 (represented by diode element D2 and element M1); and a voltage to current converter element 780 imposing a load on the battery as commanded by voltage sources 760, 770. For convenience, element 780 has a voltage to current transfer function of ⅕ or 0.2

Figure 8:
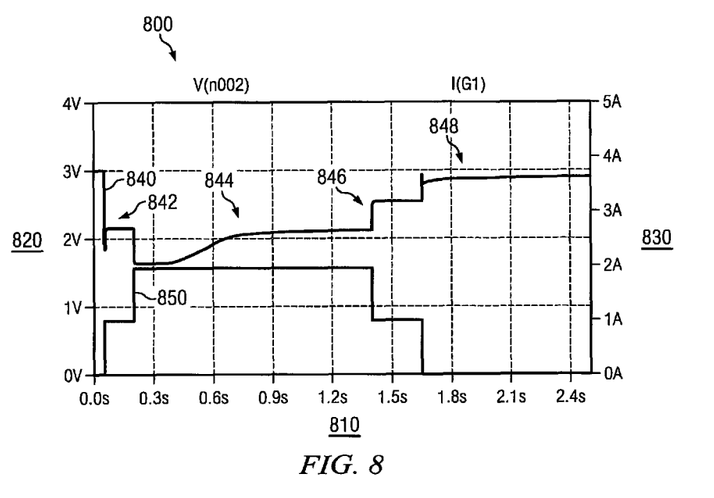
FIG. 8 is a chart that corresponds to the model of FIG. 7.
Figure 9:
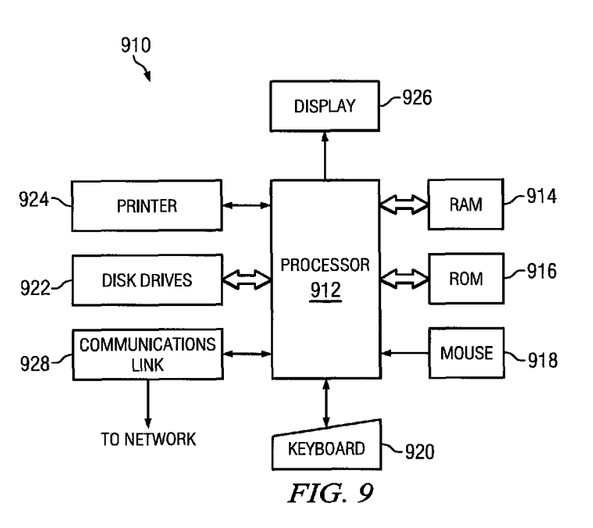
FIG. 9 is an embodiment of a general purpose computer that may be used in connection with other embodiments of the disclosure to carry out referenced functions.

FIG. 8 is a chart 800 that corresponds to the model 700 of FIG. 7. The chart 800 shows time (in seconds) on the x-axis 810; voltage (in volts) on the left y-axis 820 and applied current (in amperes) on the right y-axis 830. The top line 840 represents voltage while the bottom line 850 represents the current applied. In an ideal battery with no resistance, 3 Volts would be returned. However, there is both static ohmic resistance and resistance from passivation and polarization. Moving from left to right on the graph, an initial application of applied current at pulses of 1 amperes immediately decreases the voltage as indicated by arrow 842, which represents depassivation. After arrow 842, one can see a partial recovery as a result of depassivation. The amplitude of the current pulse increases at approximately 0.2 seconds to 2 amperes and at arrow 844, one can see that depolarization is starting to take effect where a voltage increases while the current applied remains unchanged. At arrow 846, he magnitude of the applied current decreases back to 1 Ampere while voltage increases to a value greater than that at arrow 842 for same load current of 1 Ampere, indicating a lower source resistance of the battery due to at least partial removal of the polarization charge. Finally, the magnitude of the applied current decreases again at approximately 1.6 seconds where voltage again increases to the open load value to complete the simulation interval. FIG. 9 is an embodiment of a general purpose computer 910, the components of which may be used in connection with other embodiments of the disclosure to carry out any of the above-referenced functions. The general purpose computer 910 may generally be adapted to execute any of the known OS2, UNIX, Mac-OS, Linux, Android and/or Windows Operating Systems or other operating systems. The general purpose computer 910 in this embodiment includes a processor 912, a random access memory (RAM) 914, a read only memory (ROM) 916, a mouse 918, a keyboard 920 and input/output devices such as a printer 924, disk drives 922, a display 926 and a communications link 928. In other embodiments, the general purpose computer 910 may include more, less, or other component parts. Embodiments of the present disclosure may include programs that may be stored in the RAM 914, the ROM 916 or the disk drives 922 and may be executed by the processor 912 in order to carry out functions described herein. The communications link 928 may be connected to a computer network or a variety of other communicative platforms including, but not limited to, a public or private data network; a local area network (LAN); a metropolitan area network (MAN); a wide area network (WAN); a wireline or wireless network; a local, regional, or global communication network; an optical network; a satellite network; an enterprise intranet; other suitable communication links; or any combination of the preceding. Disk drives 922 may include a variety of types of storage media such as, for example, floppy disk drives, hard disk drives, CD ROM drives, DVD ROM drives, magnetic tape drives or other suitable storage media. Although this embodiment employs a plurality of disk drives 922, a single disk drive 922 may be used without departing from the scope of the disclosure.

Although FIG. 9 provides one embodiment of a computer that may be utilized with other embodiments of the disclosure, such other embodiments may additionally utilize computers other than general purpose computers as well as general purpose computers without conventional operating systems.

Several embodiments of the disclosure may include logic contained within a medium. In the embodiment of FIG. 9, the logic includes computer software executable on the general purpose computer 910. The medium may include the RAM 914, the ROM 916, the disk drives 922, or other mediums. In other embodiments, the logic may be contained within hardware configuration or a combination of software and hardware configurations. The logic may also be embedded within any other suitable medium without departing from the scope of the disclosure.

Modifications, additions, or omissions may be made to the systems, apparatuses, and methods described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order. As used in this document, "each" refers to each member of a set or each member of a subset of a set.

To aid the Patent Office, and any readers of any patent issued on this application in interpreting the claims appended hereto, applicants wish to note that they do not intend any of the appended claims or claim elements to invoke paragraph 6 of 35 U.S.C. Section 112 as it exists on the date of filing hereof unless the words "means for" or "step for" are explicitly used in the particular claim.

What is claimed is:

1. A system for conditioning a battery, the system comprising:
    a pulse generator configured to apply a plurality of energy pulses to a polarized cathode of a battery and a passivated anode of the battery by selectively shorting the battery across the polarized cathode and the passivated anode for durations of time, the plurality of energy pulses at least partially depolarizing the polarized cathode and at least at least partially depassivating the passivated anode;
    a use sensor configured to detect a use of the battery with a device and communicate the detected use to the pulse generator; and
    wherein the pulse generator automatically applies the plurality of energy pulses upon receipt of the detected use.

2. The system of claim 1, further comprising:
    a feedback sensor configured to:
        measure an observed voltage of the energy pulses in the plurality of energy pulses during the depolarization, and
        communicate the observed voltage to the pulse generator; and
    wherein the pulse generator is configured to continue application of the energy pulses until the observed battery voltage increases to a predetermined threshold.

3. The system of claim 1, further comprising:
    a temperature sensor configured to measure a temperature of the battery and communicate temperature information to the pulse generator; and
    wherein the pulse generator automatically applies the plurality of energy pulses upon receipt of the detected use and a determination that the temperature of the battery is below a predetermined threshold.

4. The system of claim 1, wherein an amplitude of a current of each of the plurality of energy pulses is higher than twice an amplitude of a nominal current of the battery while in use with the device.

5. A system for conditioning a battery, the system comprising:
a pulse generator configured to:
apply a plurality of energy pulses to a polarized cathode of a battery, and
at least partially depolarize the polarized cathode with the plurality of energy pulses.

6. The system of claim 5, further comprising:
a use sensor configured to detect a use of the battery with a device and communicate the detected use to the pulse generator; and
wherein the pulse generator automatically applies the plurality of energy pulses upon receipt of the detected use.

7. The system of claim 5, wherein the pulse generator is also configured to apply the plurality of energy pulses to a passivated anode of the battery, the plurality of energy pulses also at least partially depassivating the passivated anode.

8. The system of claim 5, further comprising:
a temperature sensor configured to measure a temperature of the battery and communication temperature information to the pulse generator;
a use sensor configured to detect a use of the battery with a device and communicate the detected use to the pulse generator; and
wherein the pulse generator automatically applies the plurality of energy pulses upon receipt of the detected use and a determination that the temperature of the battery is below a predetermined threshold.

9. The system of claim 5, wherein an amplitude of a current of each of the plurality of energy pulses is higher than twice an amplitude of a nominal current of the battery while in use with a device.

10. The system of claim 5, wherein each of the plurality of the energy pulses is a selective shorting of the battery across the polarized cathode and an anode.

11. The system of claim 10, further comprising:
a feedback sensor configured to:
measure an observed voltage of the pulses in the plurality of pulses during the depolarization, and
communicate the observed voltage to the pulse generator; and
wherein the pulse generator is configured to continue application of the energy pulses until the observed battery voltage in the plurality of pulse rises above a predetermined threshold.

12. The system of claim 11, wherein the predetermined threshold is indicative directly of the source resistance of the battery, and, indirectly of the depth of polarization.

13. A method of conditioning a battery, the method comprising:
applying a plurality of energy pulses to a polarized cathode of a battery; and
at least partially depolarizing the polarized cathode with the plurality of energy pulses.

14. The method of claim 13, further comprising:
sensing a use of the battery with a device; and
wherein upon sensing the use of the battery with the device, the plurality of energy pulses are automatically applied.

15. The method of claim 13, further comprising:
applying the plurality of energy pulses to a passivated anode of the battery, the plurality of energy pulses also depassivating the battery.

16. The method of claim 13, wherein an amplitude of a current of each of the plurality of energy pulses is higher than twice an amplitude of a nominal current of the battery while in use with a device.

17. The method of claim 13, wherein each of the plurality of the energy pulses is a selective shorting of the battery across the polarized cathode and an anode.

18. The method of claim 17, wherein the plurality of energy pulses continue until an observed battery voltage for the pulses in the plurality of pulse rises above a predetermined threshold.

19. The method of claim 18, wherein the predetermined threshold is indicative directly of the source resistance of the battery, and, indirectly, of the depth of polarization.

20. The method of claim 13, further comprising:
determining a temperature of the battery;
wherein the application of the plurality of energy pulses to the polarized cathode of the battery only occurs when the temperature is below a predetermined threshold.

* * * * *